United States Patent [19]

Bosserman

[11] 4,443,058

[45] Apr. 17, 1984

[54] TEST IMAGE PROJECTOR FOR TESTING IMAGING DEVICES

[75] Inventor: David A. Bosserman, Alexandria, Va.

[73] Assignee: The United States of America as represented by the Secretary of the Army, Washington, D.C.

[21] Appl. No.: 304,505

[22] Filed: Sep. 22, 1981

[51] Int. Cl.³ .............................................. G02B 5/10
[52] U.S. Cl. ..................................... 350/294; 353/99
[58] Field of Search .................... 353/98, 99; 350/294, 350/435, 442, 443, 445, 446; 356/124

[56] References Cited

U.S. PATENT DOCUMENTS 3,244,073  4/1966  Bouwers et al. .................... 350/443
3,647,284  3/1972  Elings et al. ......................... 350/294

Primary Examiner—F. L. Evans
Attorney, Agent, or Firm—Robert P. Gibson; Milton W. Lee; Max L. Harwell

[57] ABSTRACT

A test image projector operating in the ultraviolet through infrared spectrum that is comprised of two symmetrically mounted identical mirrors which are off-axis sections of an astronomical quality parabola. The first mirror produces collimated beams from object points and reflects these collimated beams onto the second mirror while the second mirror refocuses the collimated beams into diffraction limited image points, and thus provides a diffraction limited test image. The test image is used to check the quality of optical and electrooptical systems.

9 Claims, 1 Drawing Figure

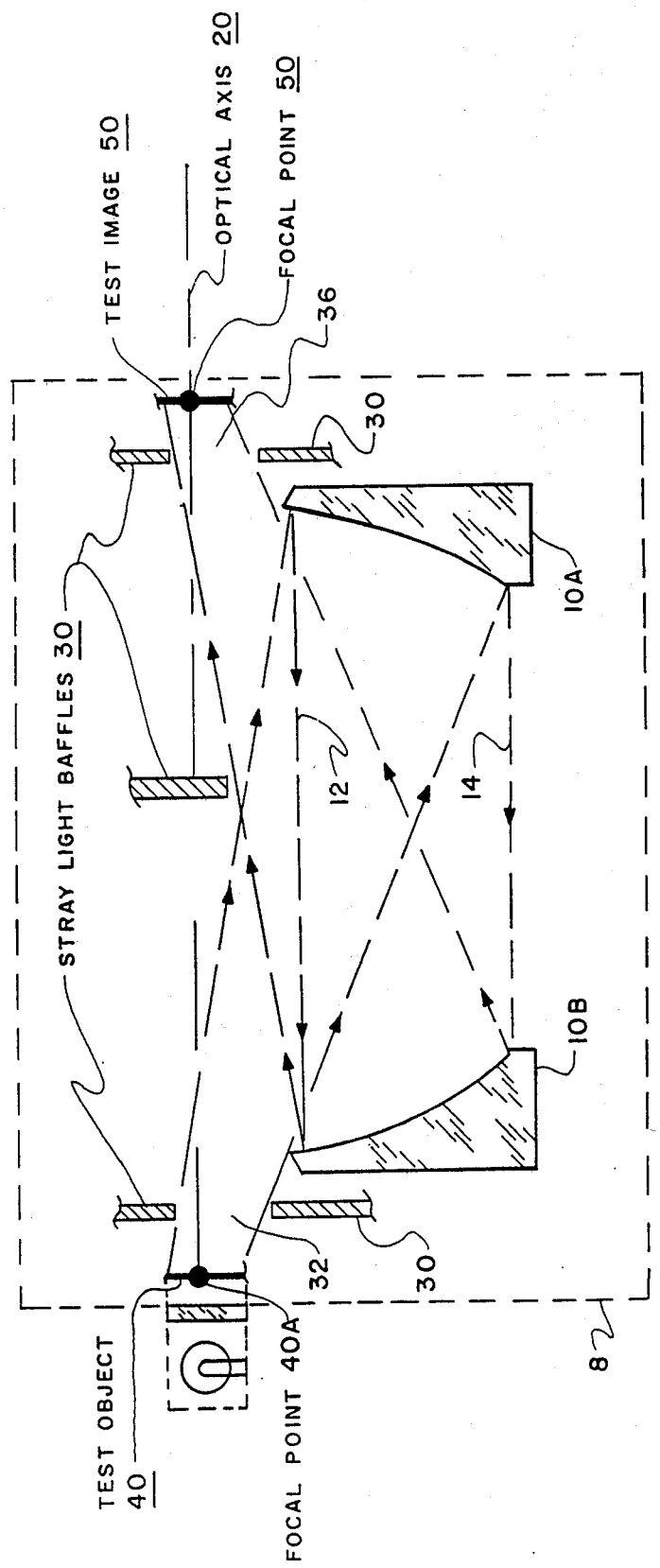

TEST IMAGE PROJECTOR FOR TESTING IMAGING DEVICES

The invention described herein may be manufactured, used, and licensed by the U.S. Government for governmental purposes without the payment of any royalties thereon.

BACKGROUND OF THE INVENTION

1. Field of the Invention

The invention is in the field of imaging device system testing by use of a diffraction limited test image projector.

2. Description of the Prior Art

Test image resolution patterns projected into an imaging device, such as optical or electrooptical systems like the image intensifier system, tend to have chromatic and geometrical abberations which limit the sharpness of the image formed by the lens sytem inside the projector from which the resolution patterns are projected. These abberations tend to enlarge the points of light so that each point merges with the other points close thereto. The resolving power of lens, or lens system, is usually enough that any lack of sharpness of detail is too slight to be observed. However, some imaging devices require a higher quality, i.e. diffraction limited, test image for testing the resolution thereof.

The present test image projector solves the problem of obtaining a diffraction limited test image with broad or narrow spectral band radiation sources in the ultraviolet through the infrared spectrum. Chromatic abberation is eliminated and geometrical abberations are minimized to well below the diffraction limit.

SUMMARY OF THE INVENTION

The present invention is a test image projector which operates in the ultraviolet and infrared spectrum for testing the resolution of optical and electrooptical imaging device systems. The projector is comprised of two identical mirrors which are off-axis sections of a well figured parabola of astronomical quality and a plurality of baffles that are positioned to reduce stray light. The first mirror produces collimated beams from test object points while the second mirror refocuses the collimated beams into diffraction limited image points to produce a diffraction limited test image for test purposes.

The invention will be better understood with reference to the lone FIGURE which is a side view schematic of the image projector.

DETAILED DESCRIPTION OF THE INVENTION

The lone FIGURE illustrates the elements of the present test image projector, which may be contained entirely in a housing means, represented in outline by numeral 8. The test object 40 and its focal point 40A and test image 50 and its focal point 50A may however be external to housing means 8. The test object 40 may be some resolution pattern producing means, such as a light source behind a reticle, in a separate housing attached to housing 8 wherein the test object focal point 40A is also in the separate housing.

The projector is comprised of two identical mirrors, namely first mirror 10A and second mirror 10B, that are symmetrically mounted by some mounting means, such as standard mirror mounts of which many types are available, inside the housing means. Housing means 8 may be a rectangular box with sufficient rigidity to maintain optical alignment of all the elements therein, i.e. alignment of mirrors 10A and 10B cooperatively with stray light baffles 30, which block stray light.

The parabolic mirror sections 10A and 10B are approximately circular and entrance aperture 32 and exit aperture 36, formed by baffles 30, are also preferably circular but larger than the useable light rays or beams. Mirrors 10A and 10B are made of any glass of astronomical quality and are purely reflective off the front surfaces thereof. The test for astronomical quality of the mirror reflective surfaces are made by the well known focoult knife-edge test. The high quality of the mirrors and their symmetrical mounting with respect to each other as off-axis sections about a common optical axis 20 provide optical means for projecting test object points into diffraction limited test image points. Chromatic abberation is eliminated and geometrical abberations are minimized since the mirrors are made of astronomical quality glass, are purely reflective off the front surfaces, and are symmetrically mounted. The object plane and the image plane are perpendicular to the optical axis 20 at the focal points 40A and 50A respectively of the first mirror 10A and second mirror 10B. The test object 40 and test image 50 sizes may be limited to about one-quarter of an inch in diameter for diffraction limited performance although an area of about one square inch can be viewed with acceptable visual image quality. Mirrors 10A and 10B are symmetrically mounted with the common optical axis 20 so as to form an image with unity magnification in the focal plane of second mirror 10B of an object in the focal plane of the first mirror 10A. The optical axes of the projector is matched with the optical axis of the imaging device, such as the image intensifier, being tested with the test image being at the input plate of the imaging device. Even though the image intensifier tubes operate in the 0.5 micron to 0.9 micron wavelength, the present test image projector may be used at shorter and longer wavelengths, such as in the broad or narrow spectral band radiation sources from the ultraviolet through infrared wavelengths of from 0.1 micron through 10 microns and more, which wavelength depending on the mirror coatings.

The path of the light beams through the projector are as follows. Test object points from test object 40 enter the entrance aperture 32 and reflects off the first mirror 10A as collimated beams, represented as numerals 12 and 14, which are then refocused off second mirror 10B as diffraction limited image points through the exit aperture 36 to produce the diffraction limited test image 50. Mirrors 10A and 10B are symmetrically mounted with respect to optical axis 20. The object plane and the image plane are perpendicular to the optical axis 20 at focal points 40A and 50A of respectively of first and second mirrors 10A and 10B. Stray light baffles 30 limit the light beams to only the beams striking the surfaces of the mirrors.

Although a specific embodiment has been shown and described, other embodiments may be obvious to one skilled in the art in view of and within the scope of the invention as herein described.

I claim:

1. A test image projector for testing the resolution of imaging devices, said projector comprising:
    means for providing test object points;
    optical means comprised of two identical mirrors which are off-axis sections about a common optical axis of said test image projector and are of an astronomical quality parabola which are purely reflective off the front surface thereof for projecting said test object points into a diffraction limited test image; and housing means comprised of entrance and exit apertures and stray light baffles wherein said optical means is mounted and optically aligned in cooperative alignment with said entrance and exit apertures, said stray light baffles blocking stray light from said test image whereby the optical axis of said test image projector is aligned with the optical axis of said imaging devices.

2. A projector as set forth in claim 1 wherein said two identical mirrors are comprised of a first mirror that produces collimated beams from said test object points and a second mirror that refocuses said collimated beams into diffraction limited image points to produce said diffraction limited test image.

3. A projector as set forth in claim 2 wherein the reflective surfaces of said two identical mirrors are approximately circular with said entrance and exit apertures and said stray light baffles are also approximately circulars and slightly larger than the useable light ray beams.

4. A projector as set forth in claim 3 wherein said reflective surfaces are purely reflective off the front surfaces of said two identical mirrors and said two identical mirrors are symmetrically mounted on standard mirror mounts in an offset position from said optical axis of said test image projector in which an object focal plane and an image focal plane are perpendicular to said optical axis at the focal points of said two identical mirrors.

5. A projector as set forth in claim 4 wherein said housing means is comprised of a rectangular box with sufficient rigidity to maintain optical alignment.

6. A projector as set forth in claim 5 wherein said means for providing test object points is comprised of a test object in the object focal plane of said first mirror at said entrance aperture that forms said diffraction limited test image with unity magnification in the focal plane of said second mirror at said exit aperature.

7. A projector as set forth in claim 6 wherein said test object is comprised of resolution pattern producing means.

8. A projector as set forth in claim 7 wherein said resolution pattern producing means is comprised of a light source behind a reticle to provide said test object points therefrom in a separate housing attached to said housing means wherein the resolution pattern is at said object focal plane.

9. A projector as set forth in claim 8 wherein said diffraction limited test image is in the ultraviolet through the infrared spectrum.

* * * * *